United States Patent [19]

Schram

[11] 4,385,837

[45] May 31, 1983

[54] APPARATUS AND SYSTEM FOR LINEWIDTH MEASUREMENTS

[75] Inventor: Richard R. Schram, Burbank, Calif.

[73] Assignee: Irvine Optical Corporation, Burbank, Calif.

[21] Appl. No.: 229,655

[22] Filed: Jan. 29, 1981

Related U.S. Application Data

[63] Continuation-in-part of Ser. No. 908,232, May 22, 1978.

[51] Int. Cl.³ ............................................ G01B 11/02
[52] U.S. Cl. .................................... 356/387; 356/372; 356/384; 250/560
[58] Field of Search ............... 356/372, 375, 383, 384, 356/387; 250/234, 559, 560, 571

[56] References Cited

U.S. PATENT DOCUMENTS

| | | | |
|---|---|---|---|
| 2,572,119 | 10/1951 | Dieke | 356/306 |
| 3,141,057 | 7/1964 | Acton | 250/560 |
| 3,740,152 | 6/1973 | Iisuka | 356/375 |
| 3,782,834 | 1/1974 | Fujimori et al. | 250/560 |
| 3,850,526 | 11/1974 | Corey | 250/571 |
| 4,140,399 | 2/1979 | Janchen | 356/332 |

FOREIGN PATENT DOCUMENTS 1006704  10/1965  United Kingdom ................. 250/560

Primary Examiner—R. A. Rosenberger
Attorney, Agent, or Firm—Bruce H. Johnsonbaugh

[57] ABSTRACT

An apparatus and system for measuring the linewidths on masks and wafers utilizing a photodevice having a slit of predetermined dimension by moving the photodevice along the circumference of a circle whose center is coincident with the exit pupil of a microscope eyepiece. The photodevice and slit are moved through a predetermined radius (whose center coincides with the exit pupil) by means of a lead screw under the actuation of a reversible drive motor by way of a potentiometer interposed between the lead screw and the motor. The electrical resistance of the potentiometer, at any point thereof, is directly proportional to the linear position of the slit with respect to the projected image. The electrical resistance of the potentiometer is converted to a voltage value and is displayed, in arbitrary units, on a digital voltmeter. A trigger circuit controls the circuit display from the potentiometer so that the dimension from the leading edge to the trailing edge of a linewidth is displayed without any human judgment. Thus, by monitoring and controlling the digital display from the potentiometer in response to the output of the photodevice, the voltage read-out is proportional to the actual width of the line on the mask or wafer.

1 Claim, 9 Drawing Figures

APPARATUS AND SYSTEM FOR LINEWIDTH MEASUREMENTS

CROSS-REFERENCE TO RELATED APPLICATION

This application is a continuation-in-part of Patent Application Ser. No. 908,232, filed May 22, 1978, by the same title and by the same inventor.

BACKGROUND OF THE INVENTION

The field of this invention relates to a apparatus for measuring linewidths on masks and wafers employed in the manufacture of large-scale-integrated (LSI) devices and more particularly, to an apparatus for accurately ascertaining the aforesaid linewidth measurements.

As is well known within the prior art, there are universally utilized various small-feature-size masks to fabricate microelement devices. A typical such mask comprises a planar glass member having an opaque coating such as chrome desposited thereon. In conventional ways, the opaque coating is selectively patterned to form multiple regions of chip areas, each having opaque and transparent portions. Illustratively, the regions are patterned to be identical replicas of each other. In each region, clear or transparent features may be formed in an opaque background, or vice versa.

Typically, the pattern or subregion, is visible to an operator using a microscope. By way of example, a typical subregion could be one millimeter in diameter. Again, as herein above mentioned, the mask subregion comprises clear portions and opaque portions (or lines). It is well recognized that highly accurate control is required for the linewidths formed on masks and wafers as these linewidths are extremely critical to the overall process of manufacturing LSI devices. Thus, for example, before using a set of masks to form features on an associated wafer, it is important that each of the masks be checked to determine whether or not specified linewidths thereon have been made within specified tolerances. A wafer is an opaque base uon which lines are formed.

In a prior art linewidth measurement device, a procedure is followed which includes making a calibrated and normalized measurement of the average light transmission (or reflection) in a specified subregion, the latter including a feature whose linewidth is to be determined. In turn, this measurement is automatically converted to a linewidth reading by analog computing circuitry.

One known apparatus for measuring linewidths within selected subregions of a microelement, wherein each subregion includes features exhibiting two contrasting optical properties, comprises two reference subregions each uniformally exhibiting a different one of the two contrasting optical properties. Included within this apparatus is an illuminating source for directing light at each one of the reference subregions and at a selected subregion to be measured. Light responsive means is provided to obtain light directly from the source and from light which is impinged upon a reference subregion for generating normalized reference and subregion signals. A processor is arranged for the normalized signals to generate a signal representative of one of the optical properties of the selected subregion. Finally, a process is also arranged for the last mentioned representative signal in accordance with a predetermined relationship to generate a signal directly representative of a specified linewidth in a selected subregion. Although this type of apparatus has its own unique set of characteristics, it is complex in nature and calls for optical and electrical elements which are expensive to maintain and to operate.

Previous to this invention, all known linewidth measuring devices are moved lineally by moving the specimen. Moving of the specimen inherently requires tremendous accuracy and sensitivity in order to make accurate measurements. Accurate measurements are extremely necessary in order to successfully transfer a pattern from a mask. The measuring system used should be reliable in order to confidently proceed from one step to the next succeeding step in the forming of a microelement. The ultimate yield of usable chips per wafer is a direct function of each step in the process which includes the measuring of dimensions.

Normally a microelement is composed of a plurality of superimposed, thin wafer layers. Because each succeeding layer is superimposed on another layer, line dimensions become extremely important in order to achieve the desired electrical conducting path without the producing of any electrical shorts. Accordingly, there is a definite need for a simplified, low cost and accurate linewidth measurement apparatus.

SUMMARY OF THE INVENTION

The structure of this invention mounts a mask or wafer upon a planar supporting surface which is capable of being moved within the x and y direction. A subregion of the mask or wafer is observed by a microscope and projected through an eyepiece along the z axis. The enlarged projected image is located adjacent a photodevice. The photodevice includes an access opening in the form of a slit of predetermined dimension. The photodevice and its associated slit are mounted for pivotal movement about the exit pupil of the eyepiece of the microscope through which the image is projected. The photodevice and its associated slit are moved across the circular arc of the projected image. The movement of the photodevice and its associated slit is accomplished through use of a motor which operates through a lead screw which in turn is connected to the photodevice. An optical encoder is electrically connected to the photodevice which is to register the traverse of the photodevice and is associated slit across the projected image. The output of the photodevice as it is moved across light and dark lines of the projected image is then compared to a reference value. The resulting compared output is displayed, which is representative of the dimension of the formed lines within the projected image.

A primary objective of the present invention is to provide a simple, reliable linewidth measurement system which eliminates human judgment with respect to choosing or determining the leading and trailing edges of a linewidth on a microelement so as to facilitate measurement of narrow linewidths with greater accuracy.

A further objective of this invention is to construct an apparatus for relating a mask or wafer linewidth to the optical properties of a leading and trailing edge of a line, with the optical properties being transformed into electrical signals, processed in a predetermined manner, without human interference, to produce a value displayed digitally which is proportional to the linewidth.

A further objective of this invention is to provide an apparatus in which a photodevice and associated slit are moved laterally through a real image in a manner such that the photodevice and slit are always pointed at the exit pupil of the eyepiece of the optical observing apparatus which is generally a microscope, which assures that the light rays forming the image of an edge are identical for narrow and wide lines, thereby assuring linearity.

A still further objective of this invention is that in the accomplishment of the measurement, a trigger circuit is automatically actuated, which in turn controls a digital display so that the dimension from the leading to trailing edge of a linewidth is displayed without any operator judgment.

DETAILED DESCRIPTION OF THE SHOWN EMBODIMENT

Figure 1:
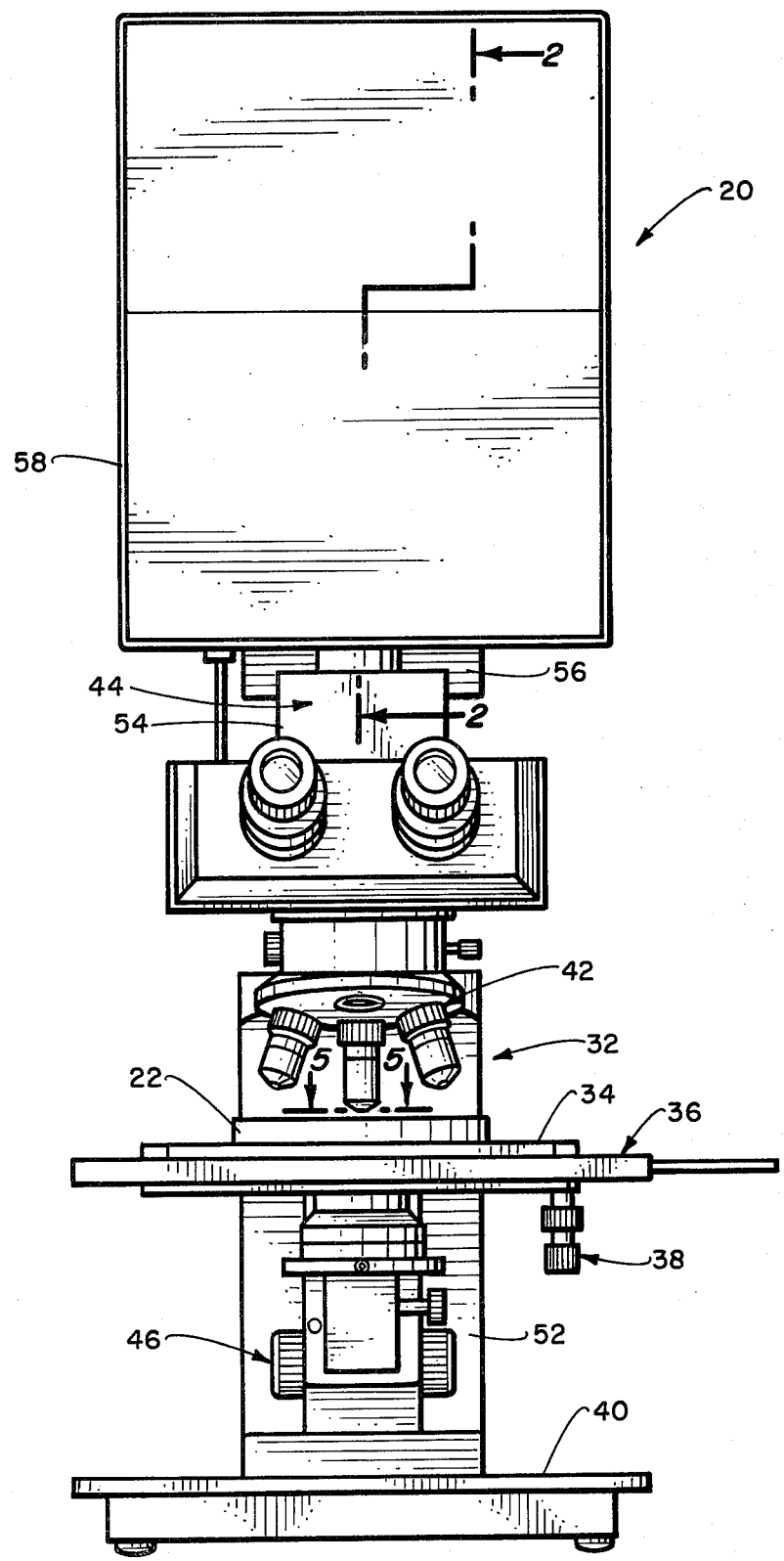
FIG. 1 is a front elevational view of the linewidth measuring apparatus of this invention.
Figure 5:
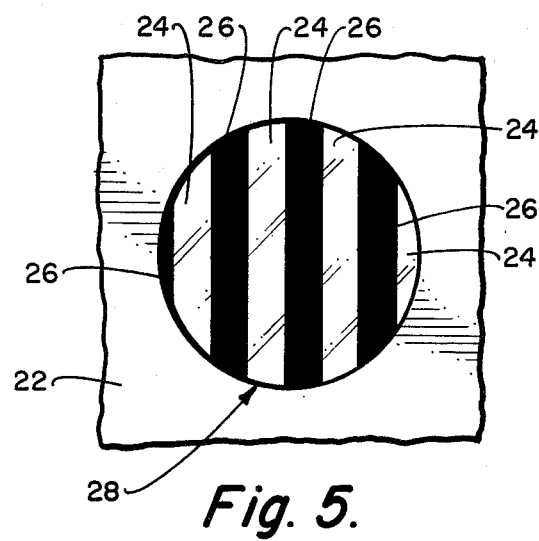
FIG. 5 is a top plan view of a subregion of a mask or wafer of a microelement within which linewidths are to be measured.
Figure 2:
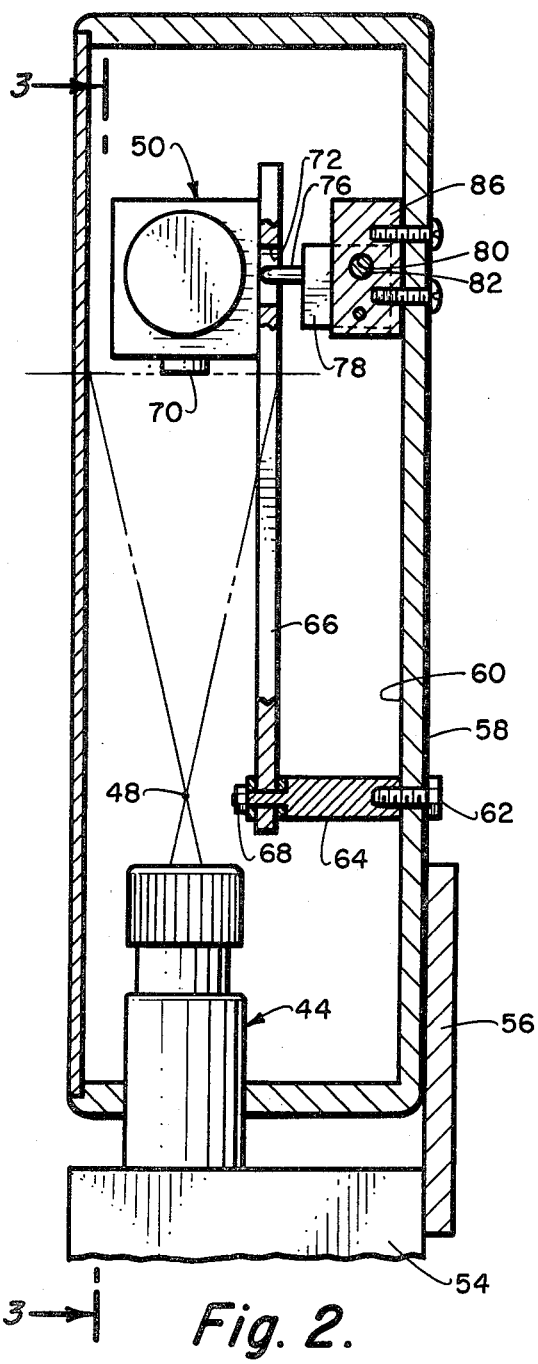
FIG. 2 is a side cross-sectional view through a portion of the linewidth measuring apparatus of this invention taken along line 2—2 of FIG. 1.

Referring particularly to the drawings, there is shown within FIG. 1, the apparatus 20 of this invention which is intended to be employed to measure linewidths on mask (or wafers) 22. The mask 22 is deemed to be conventional and is to be constructed of a series of clear or bright lines 24 interposed with a series of opaque or dark lines 26. The lines 24 and 26 are depicted generally within the circular shaped magnified section 28 shown within FIG. 5. This magnified section 28 is to be represented at projected image 30. This image 30 is produced through the use of standard microscope 32. The projected portion of the mask 22 will be quite small, such as about one millimeter in diameter.

The mask 22 is to fixedly mounted on a plate 34. The plate 34 is part of an x-y micropositioner 36. The micropositioner 36 is to be manually adjusted through knob assembly 38 to move the mask 22 along the x-y axes. The use of such a micropositioner 36 is deemed to be conventional in conjunction with a microscope 32.

Microscope 32 is mounted on a base 40. The microscope 32 includes an objective lens assembly 42 through which the projected image is to be passed into an eyepiece assembly 44. Again, the eyepiece assembly 44 and the objective lens assembly 42 are deemed to be conventional. Vertical, or z-axis adjustment of the objective lens assembly 42 and the eyepiece with respect to the mask 22 is accomplished through the use of adjusting knob assembly 46.

Through the use of the x-y positioner 36, any desired subregion 28 can be observed of the mask 22. Light is to be transmitted through the subregion 28, through the objective lens assembly 42, through the eyepiece 44 to produce the projected image 30. It is to be noted that the projected image from the eyepiece 44 has an exit pupil 48.

Fixedly mounted and upstanding from the base 40 is a mounting housing 52. The x-y positioner 36 is mounted on the mounting housing 52. Also fixedly mounted on the mounting housing 52 is an eyepiece housing 54. Fixedly secured by a mounting plate 56 to the eyepiece housing 54 is an upper housing 58. The upper housing 58 includes an internal chamber 60.

Fixedly mounted by means of a fastener 62 to the back side of the upper housing 58 is a rod 64. The free end of the rod 64 has pivotally mounted thereon one end of a pivot arm 66. The arm 66 is attached to the rod 64 by means of a screw threaded nut assembly 68.

Fixedly mounted adjacent the outer end of the arm 66 is a photodevice 50. The photodevice 50 may comprise a photocell, a photodiode, a photomultiplier tube or any other similar mechanism which changes light intensity into an electrical current or voltage. In the illustrated drawings, the photodevice 50 is in the form of a photocell having an access opening comprising a slit 70 into the interior of the photocell. The slit 70 has precise known width. The photodevice 50 is mounted on the front side of the arm 66.

Formed within the back surface of the arm 66 is a slot 72. The longitudinal center axis of the slot 72 coincides with the longitudinal center axis 74 of the arm 66. Located within the slot 72 is a pin 76. It is to be noted that the width of the slot 72 is just slightly larger than the diameter of the pin 76. This is so that, for all practical purposes, lateral movement of the pin 76 within the slot 72 is eliminated.

The pin 76 is fixedly mounted onto a nut 78. The nut 78 includes a transverse threaded hole 80. Threadably connected within the hole 80 is a lead screw 82. The lead screw 82 is rotatably mounted within a pair of spaced apart mounting brackets 84 and 86. Each of the brackets 84 and 86 are fixedly secured to the housing 58 by conventional fastening means. The outer end of the lead screw 82 is rotatably mounted within a potentiometer 88. The inner end of the lead screw is fixedly secured to the drive shaft 90 of a drive motor 92.

Figure 6:
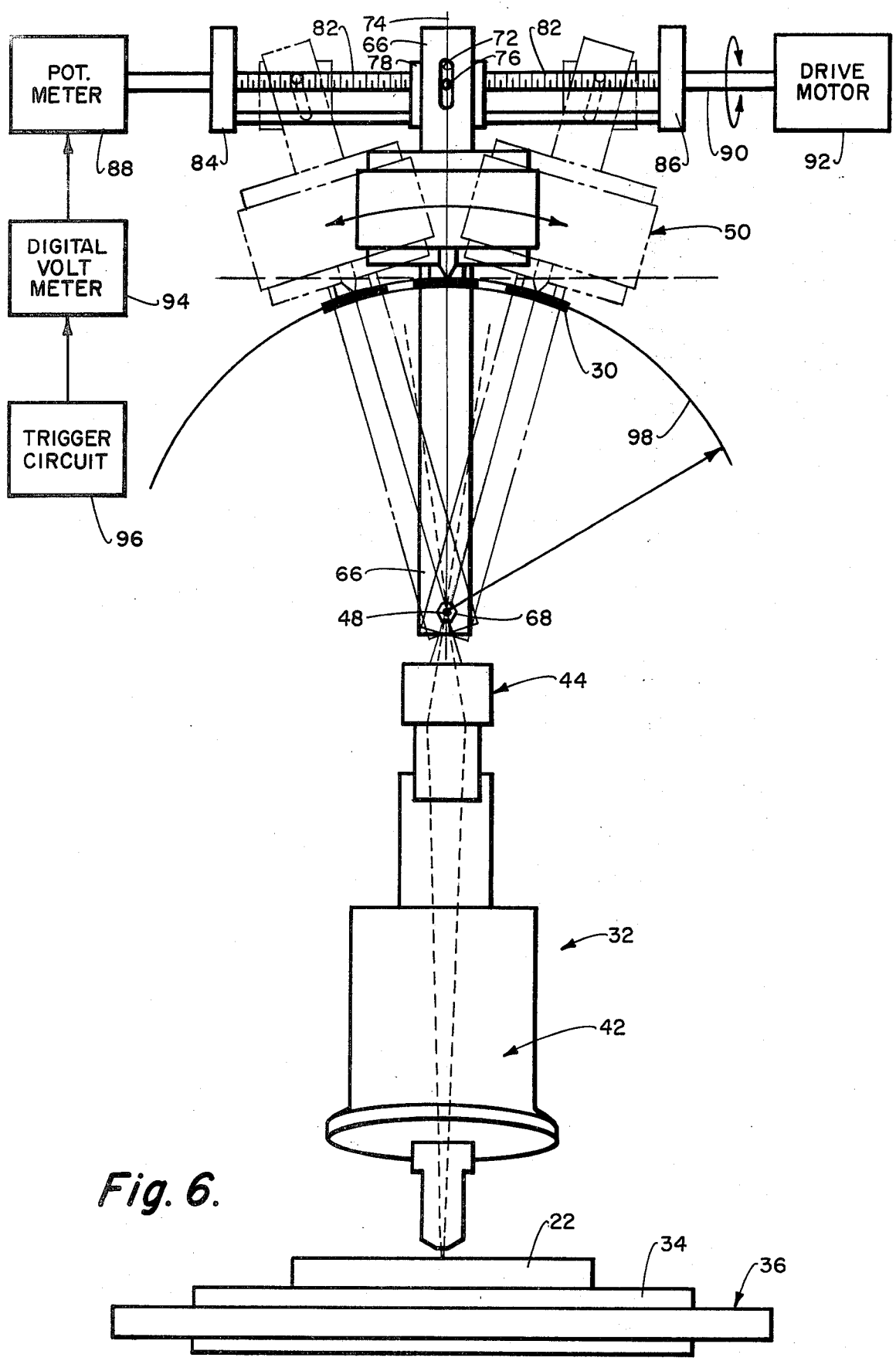
FIG. 6 is a diagramatic view of the linewidth measuring structure of this invention generally illustrating the movement of the photodevice across the projected image wherein the photodevice has been displaced from the lead screw for reasons of illustrative clarity.

Operation of the drive motor 92 causes rotation of the lead screw 82. This results in lineal movement of the nut 78. As a result, the pin 76 causes the arm 66 to be pivoted about the center which coincides with the exit pupil 48. During this pivoting of the arm 66, the pin 76 longitudinally moves within the slot 72. The pivoting of the arm 66 is graphically depicted by the phantom line positions shown within FIG. 6 of the drawings.

The drive motor 92 is to be capable of being reversibly driven. Coupled directly to the potentiometer 88 is a digital voltmeter 94. A trigger circuit 96 is operatively connected to the voltmeter 94. The operation of the potentiometer 88, the voltmeter 94 and the trigger circuit 96 will now be explained in detail.

Operation of the motor 92 causes the lead screw to rotate and the nut 78 to move lineally. Inasmuch as the photocell 50 and the slit 70 are mounted on the arm 66, the photocell 50 and the slit 70 are forced to move in the same direction as the nut 78. Because of the pivot connection about the point 48, the cell 50 and the slit 70 move along the circumference of a circle which is defined as arc 98. As previously stated, the pivot axis of the arm 66 coincides with the exit pupil of the microscope eyepiece 44.

The mask 22 and the subregion 28 that is to be tested is mounted in close proximity to the microscope objective lens assembly 42. Initially, the subregion 28 is located at the desired location through use of the x-y positioners. The drive motor 92 is then activated to move the photocell 50 across the projected image 30 across one linewidth 24.

It is desirable to have the photocell to be orientated to directly receive the rays of light. To accomplish this, the plane of this slit 70 is maintained perpendicular to the direction of the image forming rays. This is achieved by continuously "positioning" the photocell 50 and slit 70 toward the exit pupil.

It is to be understood that due to manufacturing variations that the width of one line 24 will not be exactly the samme as another line 24. However, by using the linewidth measuring structure of this invention, it can be ascertained whether established manufacturing tolerances are still being met and, if not, appropriate corrective action is to be taken in the manufacturing of the mask 22.

Figure 7:
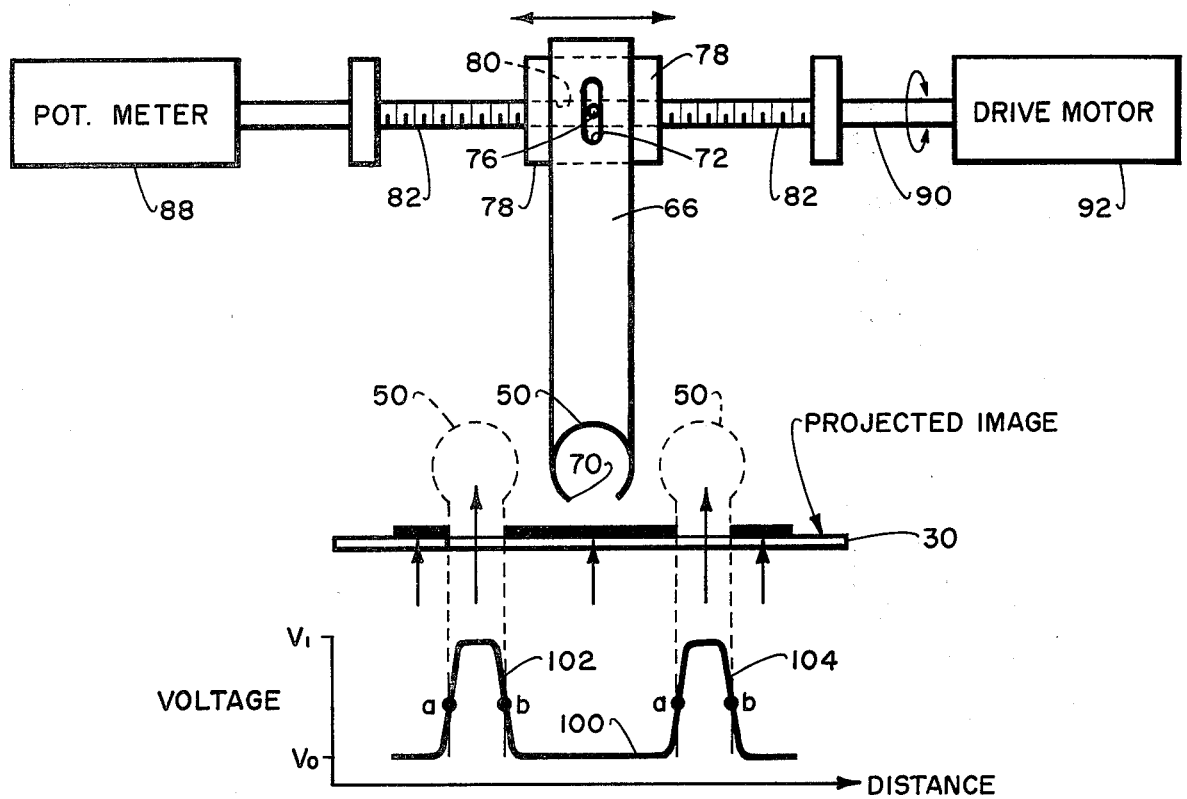
FIG. 7 is an illustrative front view of the photodevice and its associated slit within the linewidth measuring apparatus of this invention showing the photodevice in different positions with respect to the projected image of a mask; a graph of the voltage output of the photodevice in these different positions is also illustrated.
Figure 9:
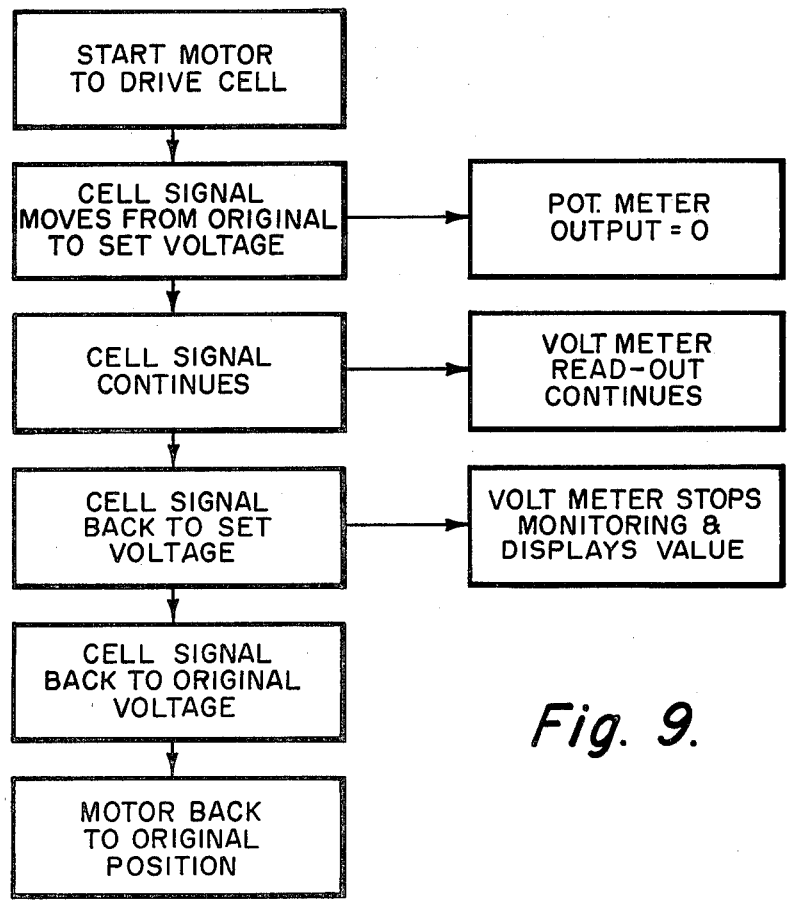
FIG. 9 illustrates a flow diagram which summarizes the linewidth measurement technique according to the invention.

The position of the lead screw 82 as it is moved by the motor 92 can be determined at any point in time by reading of the voltage across the potentiometer 88. As the slit 70 moves across the projected image 30, a graph, similar to what is shown in FIG. 7, results, which represents the voltage output of the photocell 50. The voltage output of the photocell 50 is monitored by the digital voltmeter 94. Referring particularly to the graph shown within FIG. 7, there is shown line 100 which includes a pair of spaced-apart projecting sections 102 and 104. Both sections 102 and 104 have points denoted as "a" and "b". When the voltage output of the photocell 50 reaches, for example, point "a" of section 102, the digital voltmeter 94 will then be automatically set at zero and as the slit 70 continues to move, the voltage is continually read-out until the reading drops to point "b". This is also true for projecting section 104. The trigger circuit 96 controls the display from the potentiometer 88 and sets the given value of the voltmeter 94. The voltage reading is therefore proportional to the actual width of the bright line 24 that is being observed across the projected image 30. Hence, the electrical resistance of the potentiometer 88 is directly proportional to the lineal position of slit 70 with respect to the projected image 30. The electrical resistance of the photocell 50 can be converted to a voltage value and can be displayed in arbitrary units on the digital voltmeter 94. This voltmeter reading is to be displayed by a digital display assembly.

Figure 8:
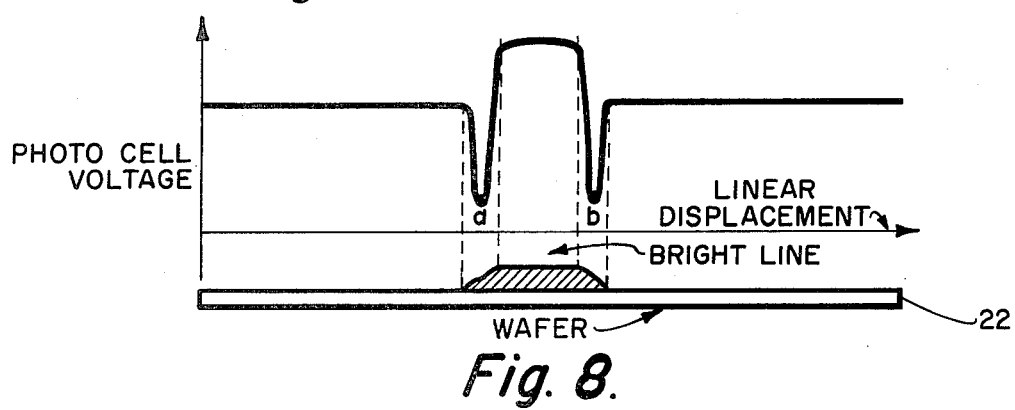
FIG. 8 shows a graph illustrating the photodevice associated with the optical signal from a wafer.
Figure 3:
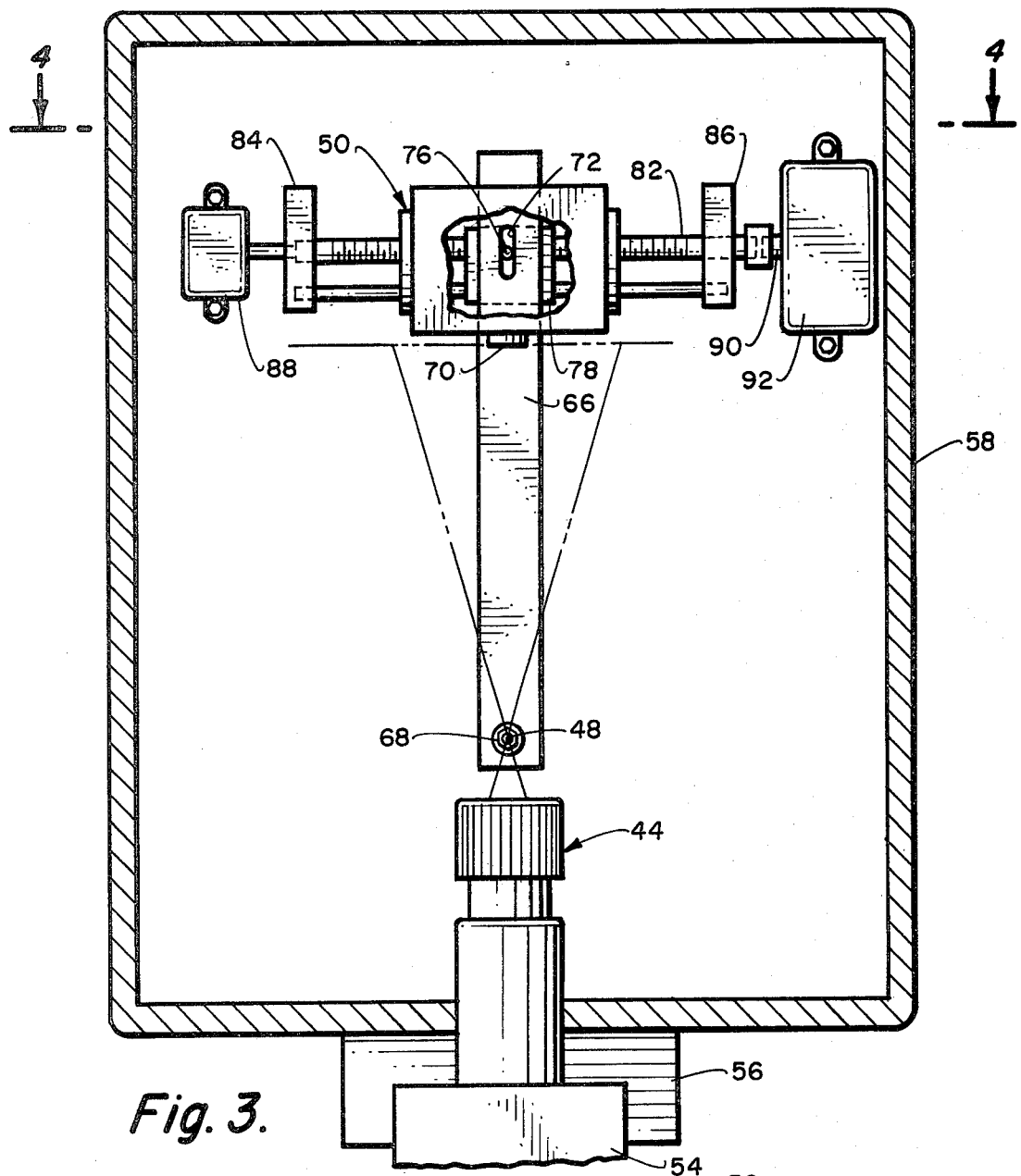
FIG. 3 is a front, partly in cross-sectional view of a portion of the structure of the linewidth measuring apparatus of this invention taken along line 3—3 of FIG. 2.
Figure 4:
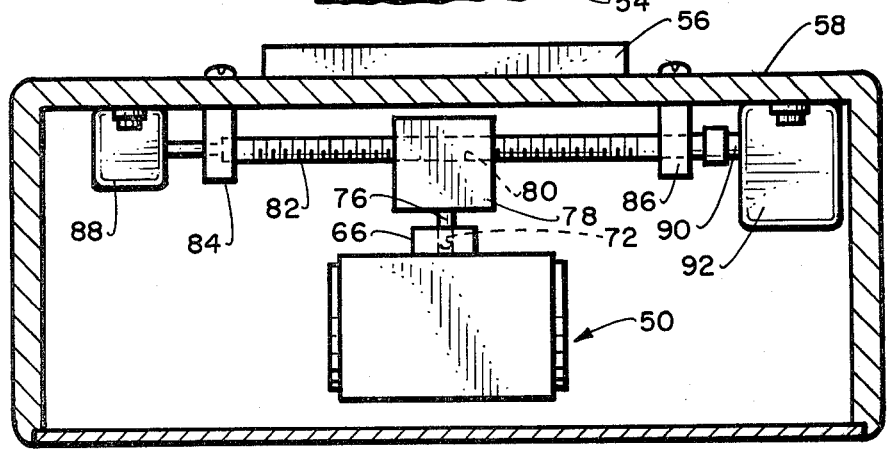
FIG. 4 is a top, partly in cross-sectional view through a portion of the linewidth measuring apparatus of this invention taken along line 4-4 of FIG. 3.

FIG. 8 is related to the optical signals from a wafer to show the difference in the read-out of the potentiometer 88, as displayed by the digital voltmeter 94, between the slit 70, of the photocell 50 at positions "a" and "b". The wafer is measured by reflected light where the mask is measured by transmitted light.

The aforedescribed linewidth measurement procedure is summarized by the flow diagram shown within FIG. 10. Initially, the drive motor 92 is activated to move arm 66 and thereby slit 70 across the projected image 30. When the signal from the photocell 50 reaches as set value, such as one half or one third of $V_1-V_0$, the voltage of potentiometer 88 is set to zero by trigger circuit 96. When the signal from potentiometer 88 continues at a higher value than the set value, the read-out at the digital voltmeter 94 increases. When the signal of photocell 50 decreases to just below the set value, the digital read-out stops monitoring potentiometer 88 and then displays an arbitrary value. The displayed value is proportional to the distance that the slit 70 travels between reading the first set voltage value and the second set voltage value. This displayed value is then compared to a previously ascertained calibrated known value for known linewidth dimension to therefore calculate the linewidth that is desired to be measured. Once this calibration to known linewidths has been made, the instrument can be used to then measure directly unknown linewidths.

Subsequentially, when the photocell signal (volts), drops to the original value $V_0$ to motor 92 reverses the lead screw 82 to return the photocell 50 to its original starting position and is now ready for the next cycle. It is to be kept in mind that only a single linewidth is measured at a time. Within each subregion, there are several lines to be measured. The mask or wafer is then repositioned by the x-y position so as to perform the measuring of the next linewidth.

The measuring apparatus of this invention is most useful in making larger linewidth measurements (5 to 20 micrometers). If it was only required to measure linewidths under 5 micrometers, the photodevice could be moved lineally and no correction be required due to distortion, i.e., not required to be moved on the circumference of a circle.

What is claimed is:

1. An apparatus for measuring the linewidths of a microelement, comprising:
   means for holding said microelement in a selected fixed position,
   means for projecting a fixed magnified real image of at least one line of such microelement, such image lying along a circular path the center of which is coincident with the exit pupil of said projecting means and having dark and light portions corresponding to respective portions of said microelement of different relative opacity,
   means mounted for pivotal movement about and continuously optically aligned with such exit pupil for optically scanning across such fixed image along such circular path and for producing an electrical output the amplitude of which corresponds to the relative brightness of respective adjacent portions of such image, said electrical output varying between two limit amplitudes corresponding, respectively, to the darkest and the brightest scanned portions of said magnified image, and
   means for determining the distance traversed by said optical scanning means between adjacent image portions of substantially identical selectable brightness, whereby the width, whether large or small, of such one line of such microelement, being directly proportional to such traversed distance, is directly and automatically determined by such apparatus with greatly enhanced precision and without reliance upon operator judgment.

* * * * *